US011792072B2

(12) United States Patent
Vishnoi et al.

(10) Patent No.: US 11,792,072 B2
(45) Date of Patent: Oct. 17, 2023

(54) WORKLOAD AWARE NETWORKING IN A MICROSERVICE ARCHITECTURE

(71) Applicant: RED HAT, INC., Raleigh, NC (US)

(72) Inventors: Anil Kumar Vishnoi, Mountain House, CA (US); Balaji Gargeshwari Varadaraju, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 213 days.

(21) Appl. No.: 17/324,430

(22) Filed: May 19, 2021

(65) Prior Publication Data

US 2022/0376979 A1 Nov. 24, 2022

(51) Int. Cl.
  *G06F 15/173* (2006.01)
  *H04L 41/0823* (2022.01)
  *H04L 67/1001* (2022.01)
(52) U.S. Cl.
  CPC ...... *H04L 41/0823* (2013.01); *H04L 67/1001* (2022.05)
(58) Field of Classification Search
  CPC .................... H04L 41/0823; H04L 67/1001
  See application file for complete search history.

(56) References Cited

U.S. PATENT DOCUMENTS

| 2019/0288922 A1* | 9/2019 | Viklund ................. H04L 67/60 |
| 2021/0029201 A1 | 1/2021 | Masurekar et al. |
| 2021/0044532 A1 | 2/2021 | Komu et al. |

OTHER PUBLICATIONS

Troia, S. et al. "Machine-Learning-Assisted Routing in SDN-based Optical Networks," Universidad Carlos III de Madrid, Telematics Engineering Department, Spain, pp. 3.
Rafiq, A. et al. (2019). "Intent-Based Slicing between Containers in SDN Overlay Network," Journal of Communications, pp. 12.
Extended European Search Report dated Dec. 15, 2021 for European Patent Application No. 21182066.7.

* cited by examiner

*Primary Examiner* — Thanh T Nguyen
(74) *Attorney, Agent, or Firm* — Womble Bond Dickinson (US) LLP

(57) ABSTRACT

A request to execute a workload is received from a client device. The request includes identification information associated with one or more containers of multiple containers supported by one or more host systems of multiple host systems, where the one or more containers are to execute the workload. Corresponding communication endpoints associated with the one or more containers are identified in view of the identification information. One or more network connections are configured between the corresponding communication endpoints of the one or more containers and the client device while bypassing configuring other network connections between other containers of the multiple containers and the one or more containers and further network connections between the one or more containers that do not communicate with one another when executing the workload.

20 Claims, 13 Drawing Sheets

WORKLOAD AWARE NETWORKING IN A MICROSERVICE ARCHITECTURE

TECHNICAL FIELD

Aspects of the present disclosure relate to a microservice architecture, and more particularly, to implementing workload aware networking in a microservice architecture.

BACKGROUND

Microservice architecture is an architectural style of a computing system that structures an application as a collection of services. The services can be independently developed, tested and deployed by different teams. The services include one or more workloads that are to be executed by execution environments supported by host systems of the microservice architecture. Microservice architectures enable the deployment of large, complex applications at a rapid pace.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
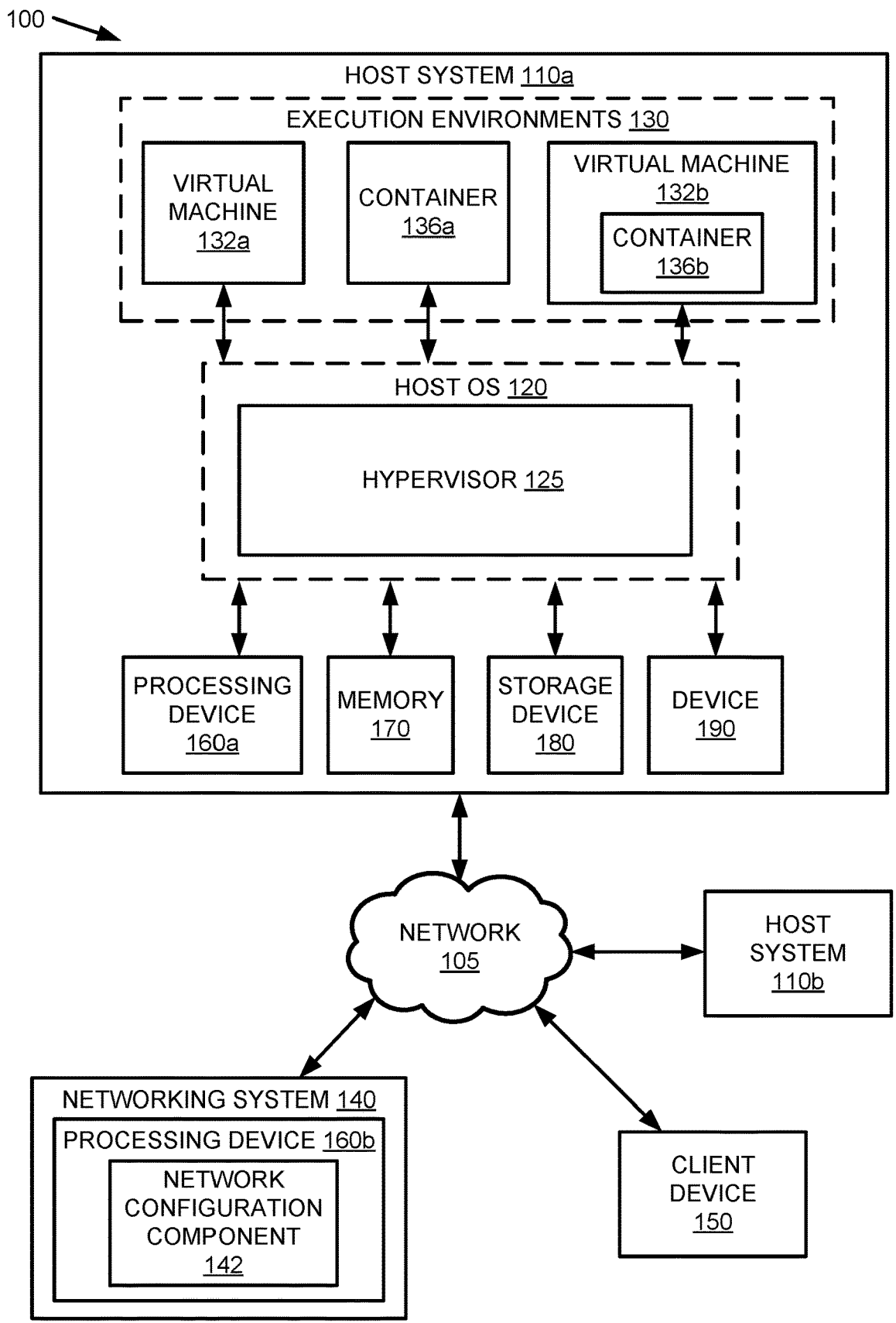
FIG. 1 is a block diagram that illustrates an example microservice architecture, in accordance with some embodiments.

On a microservice architecture, an application being developed may be made up of multiple services. Each of the services may include one or more workloads, such as method calls or internal processes. These workloads may be executed using one or more execution environments, such as virtual machines (VMs) or containers, which are supported by one or more host systems of the microservice architecture.

In a conventional microservice architecture, a client device transmits a request to execute a workload to a networking system, such as a container-orchestration system, of the microservice architecture. Upon receipt of the request, the networking system may instantiate (e.g., create) one or more execution environments on one or more host systems of the conventional microservice architecture to execute the workload associated with the request. In the conventional microservice architecture, when each of these execution environments is instantiated, the networking system configures network connections with each of the other execution environments within the microservice architecture. Each of the configurations for the individual network connections is then stored in a network configuration data structure. However, many of these network connections are not used by the execution environments, as each execution environment may communicate with a small portion of the execution environments supported by the conventional microservice architecture.

As the number of execution environments supported by a conventional microservice architecture increases, the computing bandwidth that is used to configure each of the network connections also increases. For example, a conventional microservice architecture may include hundreds or thousands of different VMs, containers, or containers residing within VMs. In the conventional microservice architecture, whenever a new execution environment is instantiated, computing bandwidth is consumed to configure network connections between the new execution environment and each of the hundreds or thousands of other execution environments supported by the microservice architecture. Similarly, when an execution environment is removed from the conventional microservice architecture, computing bandwidth is used to remove each of the hundreds or thousands of network connections.

Dedicating computing bandwidth to configuring and removing these network connections, a majority of which may be unused, decreases the performance of the conventional microservice architecture as this computing bandwidth cannot be used by the conventional microservice architecture to perform other operations (e.g., executing workloads).

Aspects of the disclosure address the above-noted and other deficiencies by utilizing workload aware networking in a microservice architecture. When a request to execute a workload is received by the microservice architecture from a client device, the request may include information associated with the execution environment(s) supported by the microservice architecture that are to execute the workload. For example, the request may include identification information for an execution environment that is currently supported by the microservice architecture. In another example, the request may include a number of execution environments that are to be used to execute the workload.

Upon receipt of the request, processing logic of the microservice architecture may identify communication endpoints for the execution environment(s) that are to execute the workload associated with the request. The communication endpoints provide connectivity for the workloads executed within the execution environments and may facilitate communication to and from the execution environments. The processing logic may use the communication endpoints to configure network connections between the execution environment(s) and the client device to facilitate communication. However, unlike a conventional microservice architecture, because the processing logic is aware of the execution environment(s) that are to be used to execute the workload, the processing logic can bypass configuring network connections between the execution environment(s) that are to execute the workload and the other execution environments of the microservice architecture that are not being used to execute the workload. In embodiments, the processing logic may also bypass configuring network connections between execution environments that are executing the workload, but do not communicate with each other. For example, if a first container and a second container are executing a workload and communicate with a client device, but do not communicate with each other, then the processing logic may configure a first network connection between the first container and the client device and a second network connection between the second container and the client device, while bypassing configuring a network connection between the first container and the second container.

By bypassing configuring these network connections to the other execution environments that will likely go unused, the number of network connections that are configured by the processing logic is reduced. Furthermore, when the execution environment(s) that are executing the workload are removed, the number of network connections that are removed by the processing logic are also reduced. Therefore, the computing bandwidth that is consumed by configuring and removing the network connections is reduced, allowing the computing bandwidth to be used to execute additional workloads or perform other operations, improving the performance of the microservice architecture.

Although aspects of the disclosure may be described in the context of a microservice architecture, embodiments of the disclosure may be applied to any computing system that configures multiple network connections and exposes workload related information to the networking system.

FIG. 1 depicts a high-level component diagram of an illustrative example of a microservice architecture 100, in accordance with one or more aspects of the present disclosure. However, other microservice architectures 100 are possible, and the implementation of a computer system utilizing examples of the disclosure are not necessarily limited to the specific architecture depicted by FIG. 1.

As shown in FIG. 1, microservice architecture 100 includes host systems 110*a*, *b*, networking system 140, and client device 150. The host systems 110*a*, *b*, networking system 140, and client device 150 include one or more processing devices 160*a*, *b*, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160*a*, *b*. It should be noted that although, for simplicity, a single processing device 160*a*, *b*, storage device 180, and device 190 are depicted in FIG. 1, other embodiments of host systems 110*a*, *b*, networking system 140, and client device 150 may include multiple processing devices, storage devices, or devices. Processing device 160*a*, *b* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also comprise one or more special-purpose processing devices such as an application specific integrated circuit (ASIC), a field programmable gate array (FPGA), a digital signal processor (DSP), network processor, or the like.

The host systems 110*a*, *b*, networking system 140, and client device 150 may be a server, a mainframe, a workstation, a personal computer (PC), a mobile phone, a palm-sized computing device, etc. In embodiments, host systems 110*a*, *b*, networking system 140, and/or client device 150 may be separate computing devices. In some embodiments, host systems 110*a*, *b*, networking system 140, and/or client device 150 may be implemented by a single computing device. For clarity, some components of networking system 140, host system 110*b*, and client device 150 are not shown. In embodiments, the networking system 140 may be a container-orchestration system. Furthermore, although microservice architecture 100 is illustrated as having two host systems, embodiments of the disclosure may utilize any number of host systems.

Host systems 110*a*, *b* may additionally include execution environments 130, which may include one or more virtual machines (VMs) 132*a*, containers 136*a*, containers 136*b* residing within virtual machines 132*b*, and host operating system (OS) 120. VM 132*a* and VM 132*b* are software implementations of machines that execute programs as though they were actual physical machines. Container 136 acts as isolated execution environments for different workloads of services, as previously described. Host OS 120 manages the hardware resources of the computer system and provides functions such as inter-process communication, scheduling, memory management, and so forth.

Host systems 110*a*, *b* may further include one or more virtual networks 134 that facilitate communication between execution environments 130 supported by host systems 110*a*, *b*. A virtual network 134 may be a network that is implemented through software to enable communication between the execution environments. The one or more virtual networks 134 are described in further detail at FIG. 2 below.

Host OS 120 may include a hypervisor 125 (which may also be known as a virtual machine monitor (VMM)), which provides a virtual operating platform for VMs 132*a*, *b* and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b, networking system 140, and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b, networking system 140, and/or client device 150.

In embodiments, processing device 160b may execute a network configuration component 142. The network configuration component 142 may receive a request from client device 150 to execute a workload. The network configuration component 142 may identify communication endpoints for execution environment(s) that are to execute the workload at host system 110a and/or host system 110b. The network configuration component 142 may configure the network connections to facilitate communication between the execution environment(s) and the client device 150. Further details regarding network configuration component 142 will be discussed at FIGS. 3-12 below.

Figure 2:
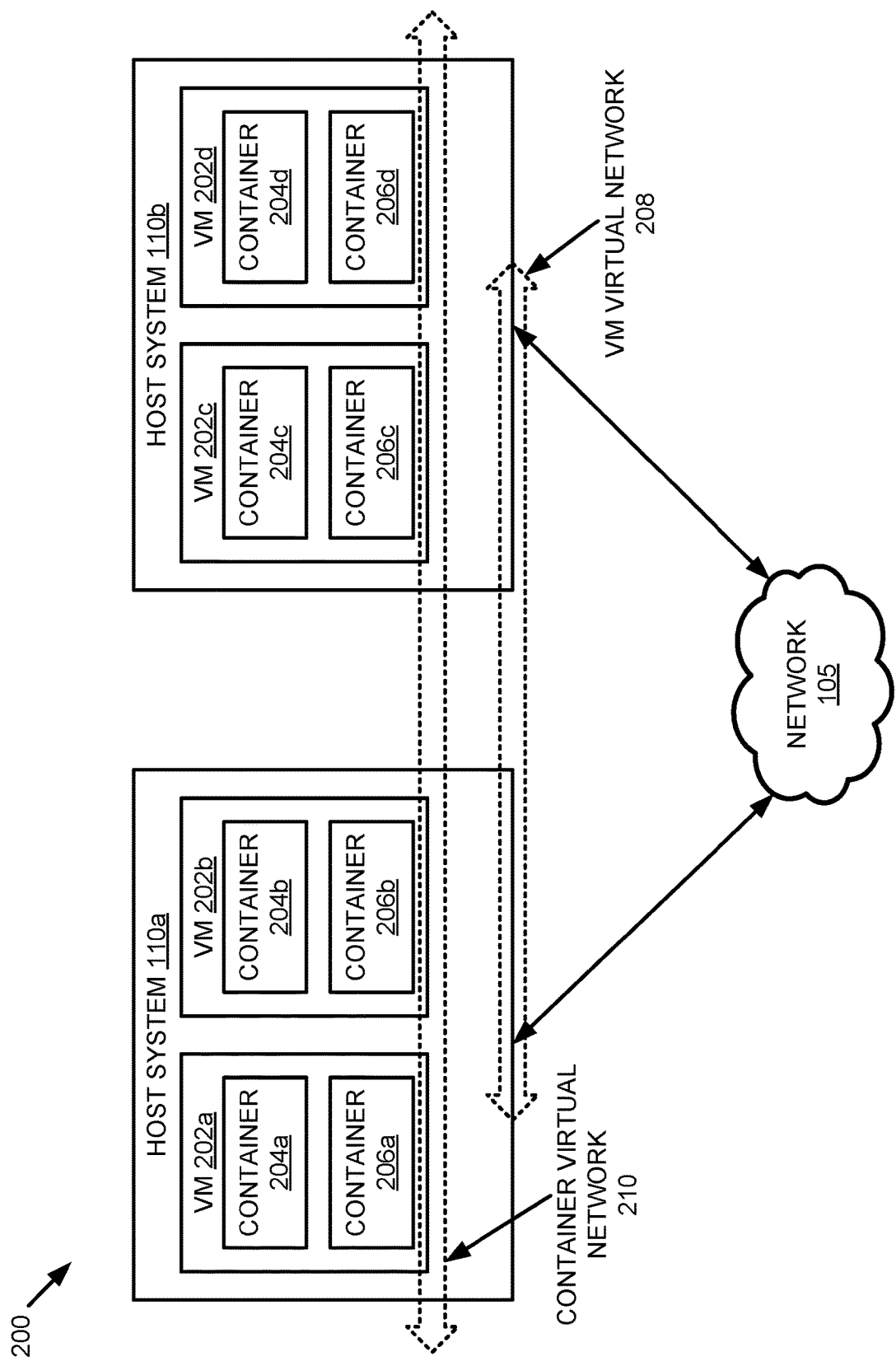
FIG. 2 is an illustration of an example of virtual network layers of a microservice architecture, in accordance with embodiments of the disclosure.

FIG. 2 is an illustration of an example of virtual network layers of a microservice architecture 200, in accordance with embodiments of the disclosure. The microservice architecture 200 may correspond to the microservice architecture 100 of FIG. 1. In embodiments, a microservice architecture 200 may utilize one or more virtual network layers to facilitate communications between different types of execution environments of the microservice architecture 200. As previously described, the execution environments may be virtual machines (VMs), containers, one or more containers residing within a VM, or any combination thereof.

Referring to FIG. 2, the microservice architecture 200 includes host system 110a, which is supporting VM 202a and VM 202b, and host system 110b, which is supporting VM 202c and VM 202d. Container 204a and container 206a reside within VM 202a, container 204b and container 206b reside within VM 202b, container 204c and container 206c reside within VM 202c, and container 204b and container 206d reside within VM 202d.

The microservice architecture 200 utilizes multiple networking layers to facilitate communications on the host system level, the VM level, and the container level. The first networking layer may correspond to network 105 that facilitates communication between host system 110a and host system 110b. The second networking layer may correspond a VM virtual network 208, implemented through software, which may facilitate communication between VM 202a, VM 202b, VM 202c, and/or VM 202d upon being configured. For example, upon configuring a network connection between VM 202a and VM 202c, VM 202a and VM 202c may transmit communications to one another via the VM virtual network 208. In embodiments, to access the VM virtual network 208, VM 202a, VM 202b, VM 202c, and/or VM 202d may utilize a virtual network switch or other type of virtual network device.

The third networking layer may correspond a container virtual network 210, implemented through software, which may facilitate communication between containers 204a-d and containers 206a-d, or any combination thereof, upon being configured. For example, upon configuring a network connection between container 204b and container 206d, container 204b and container 206d may transmit communications to one another via the container virtual network 210. In embodiments, to access the container virtual network 210, containers 204a-d and containers 206a-d may utilize a virtual network switch or other type of virtual network device.

Figure 3:
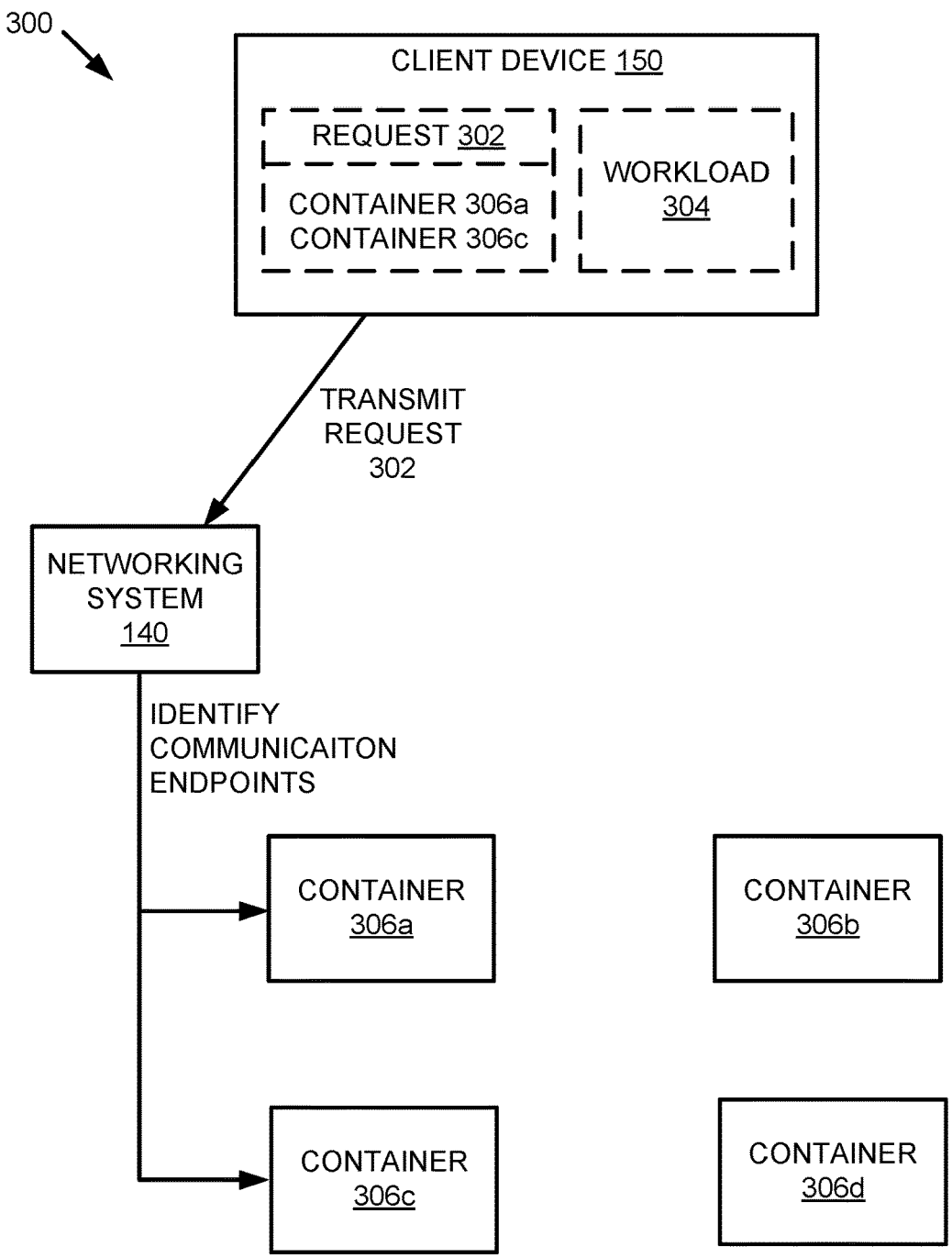
FIG. 3 is an illustration of an example of a client device transmitting a request to execute a workload to a networking system of a microservice architecture, in accordance with embodiments of the disclosure.

FIG. 3 is an illustration of an example of a client device transmitting a request to execute a workload to a networking system of a microservice architecture 300, in accordance with embodiments of the disclosure. Microservice architecture 300 may correspond to microservice architecture 100, as previously described at FIG. 1. For clarity, some elements of the microservice architecture 100 are not shown.

Referring to FIG. 3, client device 150 includes a workload 304 that is to be executed by one or more execution environments (e.g., containers 306a-d) that are supported by one or more host systems (not shown) of the microservice architecture 300. Upon identifying the workload 304 that is to be executed, the client device 150 may generate a request 302 that includes identification information for the one or more execution environments that are to execute workload 304. In embodiments, the client device 150 may determine the identification information in view of the workload 304 that is to be executed. For example, workload 304 may be associated with an application executed by client device 150 and the application may indicate particular execution environments that are to be used to execute workload 304. In an embodiment, the client device 150 may utilize other criteria to determine the identification information for the one or more execution environments. It should be noted that request 302 and workload 304 are shown for illustrative purposes only and are not physical components of client device 150.

In FIG. 3, the request 302 includes identification information for container 306a and container 306c, indicating that container 306a and container 306c are to be used to execute workload 304. Upon generating the request 302, the client device 150 may transmit the request 302 that includes the identification information to the networking system 140. The networking system 140 may use the identification information included in the request 302 to identify the communication endpoints of container 306a and container 306c that are indicated in the request 302. As previously described, the communication endpoints may provide connectivity for the workloads executed within the execution environments and may facilitate communication to and from the execution environments. In embodiments, the communication endpoints may correspond to addresses, such as a media access control (MAC) address, an internet protocol (IP) address, or a uniform resource locator (URL) address, of the corresponding containers.

Figure 4:
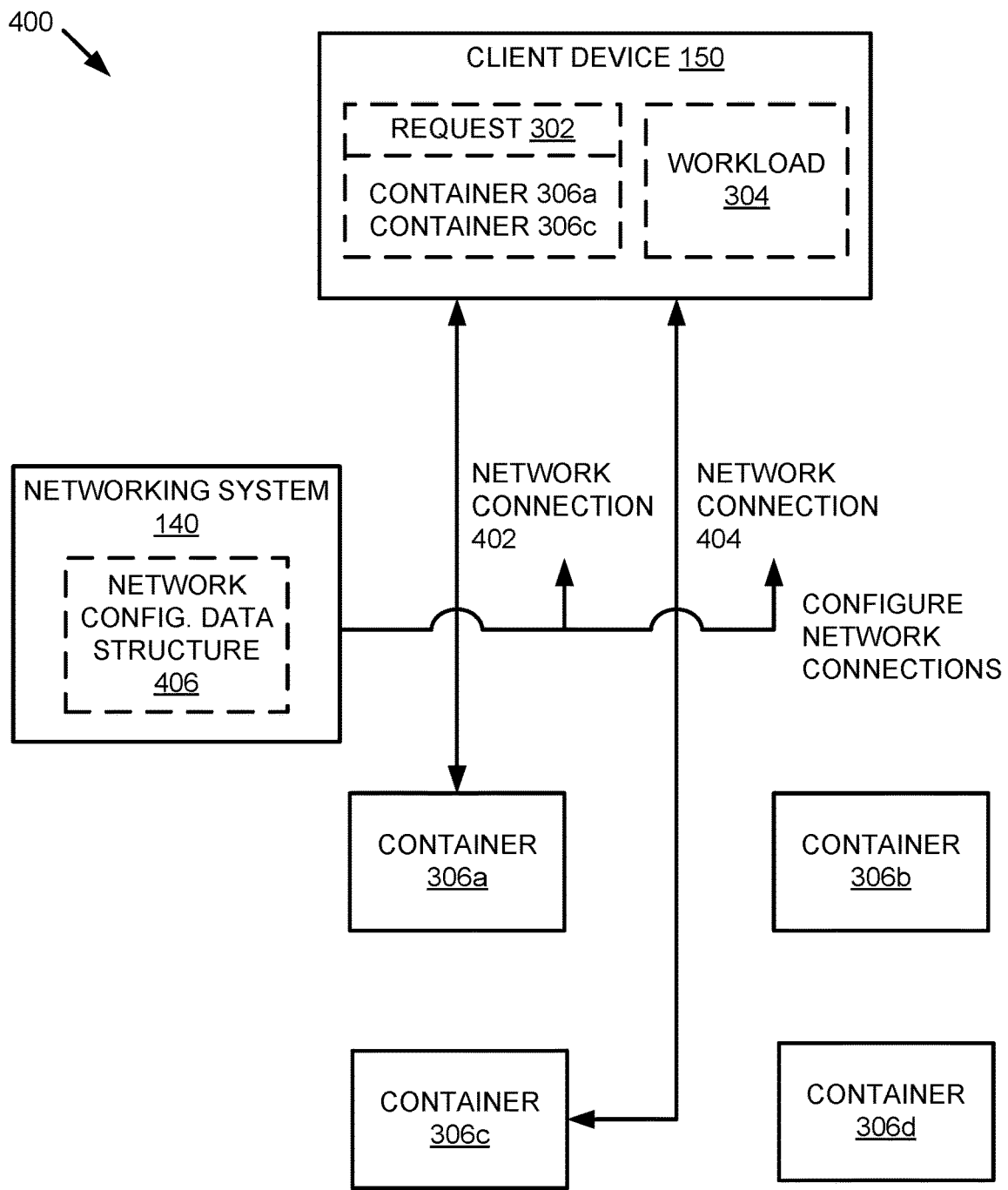
FIG. 4 is an illustration of an example of a networking system of a microservice architecture configuring network connections, in accordance with embodiments of the disclosure.

FIG. 4 is an illustration of an example of a networking system of a microservice architecture 400 configuring network connections, in accordance with embodiments of the disclosure. Microservice architecture 400 may correspond to microservice architecture 100, as previously described at FIG. 1. For clarity, some elements of the microservice architecture 100 are not shown.

Referring to FIG. 4, upon identifying the communication endpoints of container 306a and container 306c, the networking system 140 may configure network connection 402 to facilitate communication between client device 150 and container 306a and network connection 404 between client device 150 and container 306c. In embodiments, network connection 402 and/or network connection 404 may include a virtual network, such as VM virtual network 208 and/or container virtual network 210 of FIG. 2. Because the other containers (e.g., containers 306b and 306d) of the microservice architecture 400 were not identified in the request 302 as being used to execute workload 304, the networking system 140 may bypass configuring network connections to container 306b and container 306d.

Upon configuring network connection 402 and network connection 404, the networking system 140 may store the configuration information in a network configuration data structure 406. The network configuration data structure 406 may associate the communication endpoint of container 306a with client device 150 for network connection 402 and the communication endpoint of container 306c with client device 150 for network connection 404. In embodiments, the network configuration data structure 406 may also include other information associated with network connection 402 and network connection 404, such as network settings, policies, flows, or controls. In embodiments, the network configuration data structure 406 may be stored on a memory or a storage device of networking system 140 and/or one or more of the host systems of the microservice architecture 400. In embodiments, the network configuration data structure 406 may be stored in a memory that is accessible by virtual network devices that facilitate communication between virtual network layers (e.g., VM virtual network 208 and container virtual network 210 of FIG. 2) of the microservice architecture 400 to enable the configuration of network connections between different execution environments. It should be noted that the network configuration data structure 406 is shown for illustrative purposes only and is not a physical component of client device 150.

Network connection 402 and network connection 404 may be used to transmit the results of the execution of workload 304 to client device 150. For example, upon executing workload 304, container 306a may transmit the results of the execution to client device 150 via network connection 402 and container 306c may transmit the results of the execution to client device 150 via network connection 404.

Although not illustrated in FIG. 4, embodiments of the disclosure may be used to configure network connections between containers supported by one or more host systems of the microservice architecture 400. For example, request 302 may indicate that container 306c is to communicate with 306d. In such an example, networking system 140 may configure a network connection between container 306c and 306d, as previously described.

Figure 5:
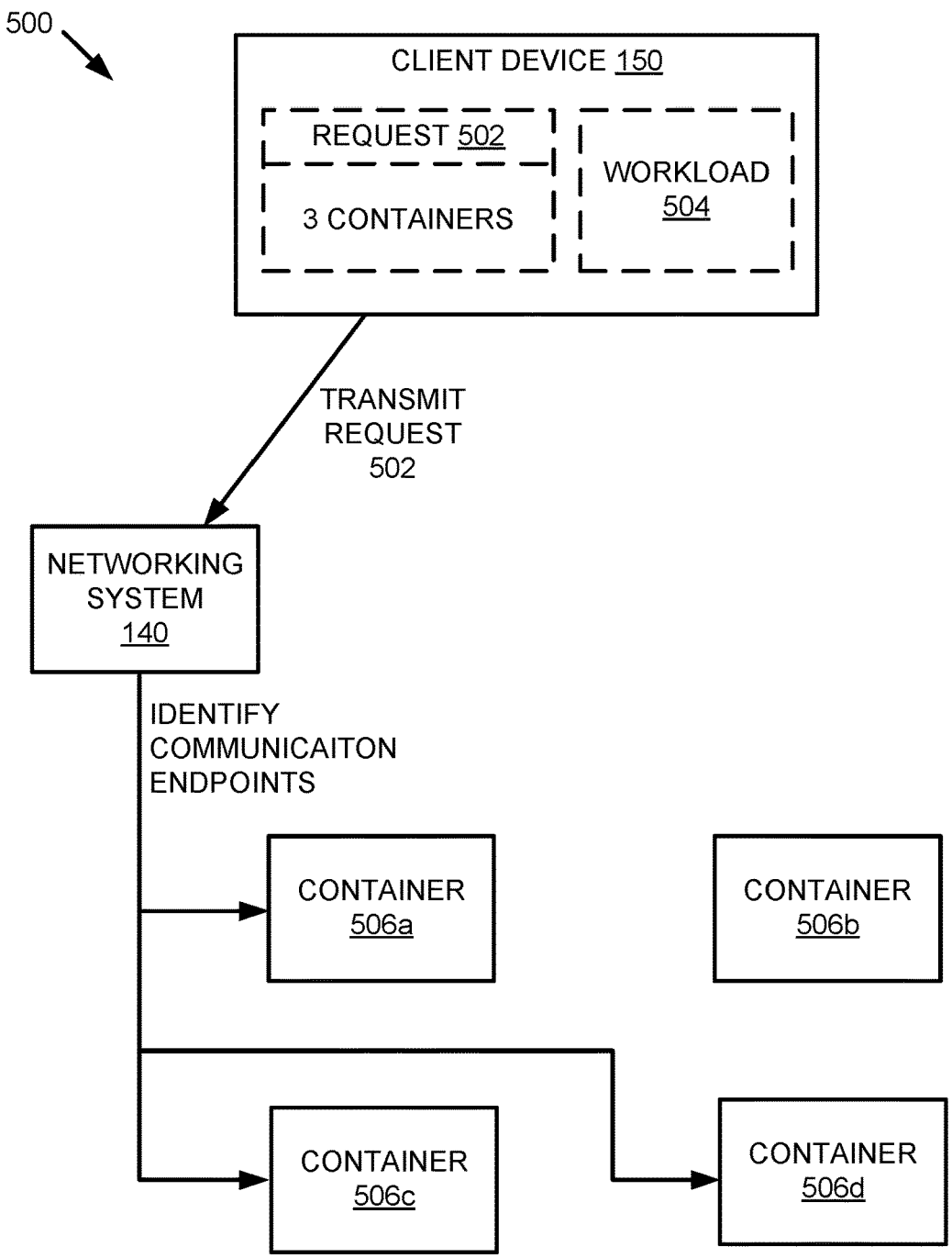
FIG. 5 is an illustration of an example of a client device transmitting a request including a number of execution environments to execute a workload to a networking system of a microservice architecture, in accordance with embodiments of the disclosure.

FIG. 5 is an illustration of an example of a client device transmitting a request including a number of execution environments to execute a workload to a networking system of a microservice architecture 500, in accordance with embodiments of the disclosure. Microservice architecture 500 may correspond to microservice architecture 100, as previously described at FIG. 1. For clarity, some elements of the microservice architecture 100 are not shown.

Referring to FIG. 5, client device 150 includes a workload 504 that is to be executed by one or more execution environments (e.g., containers 506a-d) that are supported by one or more host systems (not shown) of the microservice architecture 500. Upon identifying the workload 504 that is to be executed, the client device 150 may generate a request 502 that includes a number of execution environments that are to execute workload 504. In embodiments, the client device 150 may determine the number of execution environments in view of the workload 504 that is to be executed. For example, workload 504 may be associated with an application executed by client device 150 and the application may indicate a number execution environments that are to be used to execute workload 504. In embodiments, the client device 150 may determine the number of execution environments based on a type of the workload 504. For example, the client device 150 may determine that a particular number of execution environments are to be used for a particular type of workloads. In an embodiment, the client device 150 may utilize other criteria to determine the number of execution environments. It should be noted that request 502 and workload 504 are shown for illustrative purposes only and are not physical components of client device 150.

In FIG. 5, the request 502 indicates that three containers are to be used to execute workload 504. Upon generating the request 502, the client device 150 may transmit the request 502 that includes the number of containers to the networking system 140. In some embodiments, upon receiving the request 502, the networking system 140 may instantiate one or more of the execution environments to execute the workload at one or more host systems of the microservice architecture 500. For example, the networking system 140 may cause a virtual machine or container to be created at a host system of the microservice architecture 500 to execute workload 504. In some embodiments, upon receiving the request 502, the networking system 140 may identify execution environments that are already present on one or more host systems of the microservice architecture 500 to execute workload 504.

Upon identifying the number of containers indicated in request 502 that are to execute workload 504, the networking system identifies the communication endpoints for the identified containers, as previously described. Referring to FIG. 5, the networking system 140 has identified container 506a, container 506c, and container 506d as the three containers that are to execute workload 504. Upon identifying these containers, the networking system 140 may identify the communication endpoints of container 506a, container 506c, and container 506d.

Figure 6:
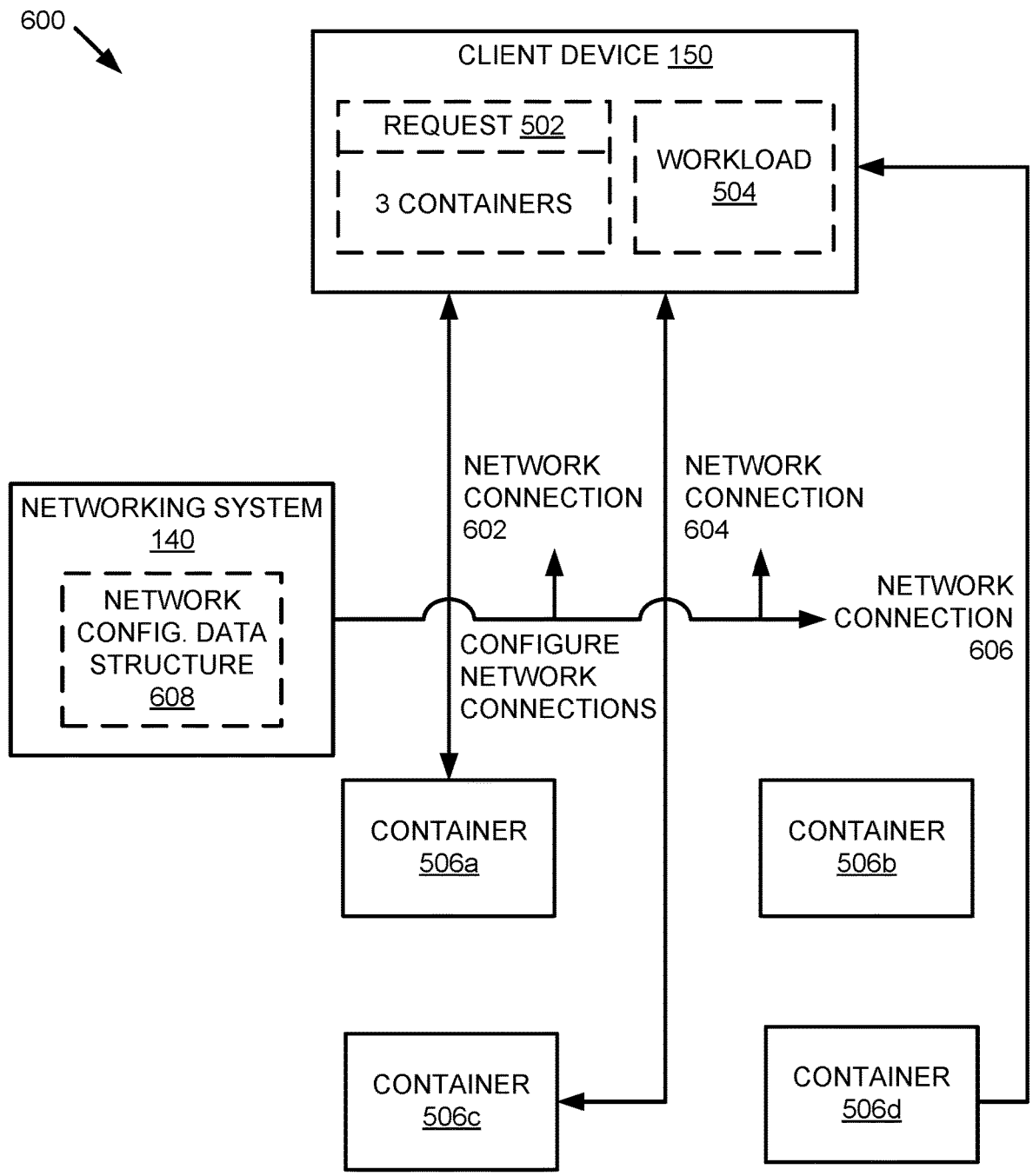
FIG. 6 is an illustration of an example of a networking system of a microservice architecture configuring network connections to a number of execution environments, in accordance with embodiments of the disclosure.

FIG. 6 is an illustration of an example of a networking system of a microservice architecture 600 configuring network connections to a number of execution environments, in accordance with embodiments of the disclosure. Microservice architecture 600 may correspond to microservice architecture 100, as previously described at FIG. 1. For clarity, some elements of the microservice architecture 100 are not shown.

Referring to FIG. 6, upon identifying the communication endpoints of container 506a, container 506c, and container 506d, the networking system 140 may configure network connection 602 to facilitate communication between client device 150 and container 506a, network connection 604 between client device 150 and container 506c, and network connection 606 between client device 150 and container 506d. In embodiments, network connection 602, network connection 604 and/or network connection 606 may include a virtual network, such as VM virtual network 208 and/or container virtual network 210 of FIG. 2. Because the other container (e.g., container 506b) of the microservice architecture 600 is not used to execute workload 504, the networking system 140 may bypass configuring network connections to container 506b.

Upon configuring network connection 602, network connection 604, and network connection 606, the networking system 140 may store the configuration information in a network configuration data structure 608. The network configuration data structure 608 may associate the communication endpoint of container 506a with client device 150 for network connection 602, the communication endpoint of container 506c with client device 150 for network connection 604, and the connection endpoint for container 506d with client device 150 for network connection 606. In embodiments, the network configuration data structure 608 may also include other information associated with network connection 602, network connection 604, and network connection 606, such as network settings, policies, flows, or controls. In embodiments, the network configuration data structure 608 may be stored on a memory or a storage device of networking system 140 and/or one or more of the host systems of the microservice architecture. It should be noted that the network configuration data structure 608 is shown for illustrative purposes only and is not a physical component of client device 150.

Figure 7:
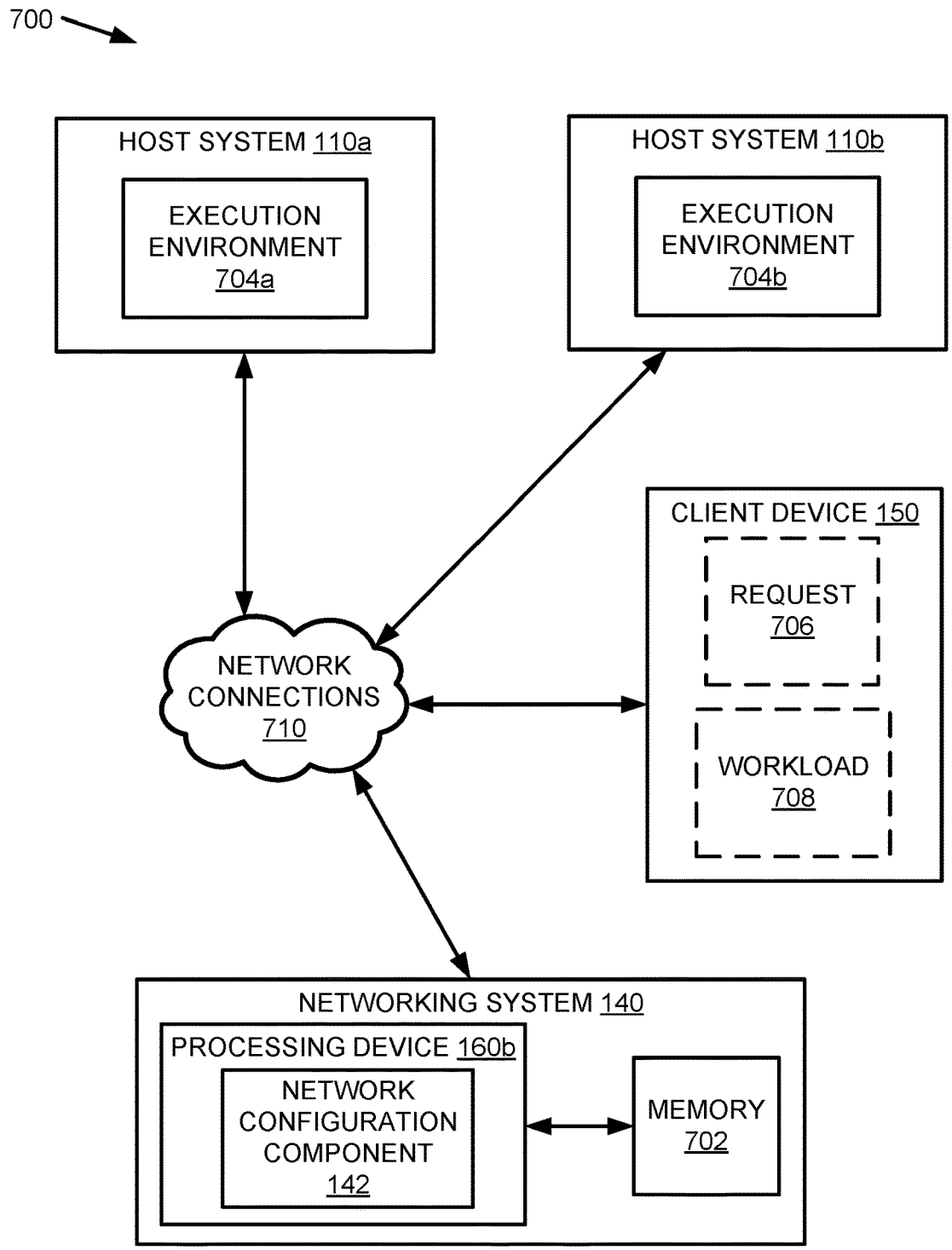
FIG. 7 is a component diagram of an example of a microservice architecture, in accordance with embodiments of the disclosure.

FIG. 7 is a component diagram of an example of a microservice architecture 700, in accordance with embodiments of the disclosure. The microservice architecture includes host systems 110a, b, networking system, client device 150, processing device 160b, and network configuration component 142 of FIG. 1.

Host system 110a and host system 110b may support execution environment 704a and execution environment 704b, respectively. As previously described, execution environment 704a and execution environment 704b may correspond VMs, containers, or one or more containers within a VM. Although illustrated as each having one execution environment, in embodiments host system 110a and host system 110b may include any number of execution environments.

The client device 150 may include a request 706 to execute a workload 708. In embodiments, request 706 may correspond to request 302 or request 502 of FIG. 3 and FIG. 5 respectively. Workload 708 may correspond to workload 304 or workload 504 of FIG. 3 and FIG. 5 respectively.

Networking system may include a memory 702 that is operatively coupled to processing device 160b. In embodiments, memory 702 may include volatile memory devices (e.g., random access memory (RAM)), non-volatile memory devices (e.g., flash memory) and/or other types of memory devices.

The host system 110a, host system 110b, client device 150, and networking system 140 may be communicatively coupled via network connections 710. In embodiments, the network connections 710 may include network 105 of FIG. 1. In some embodiments, the network connections 710 may include one or more virtual networks, such as VM virtual network 208 or container virtual network 210 of FIG. 2.

Figure 8:
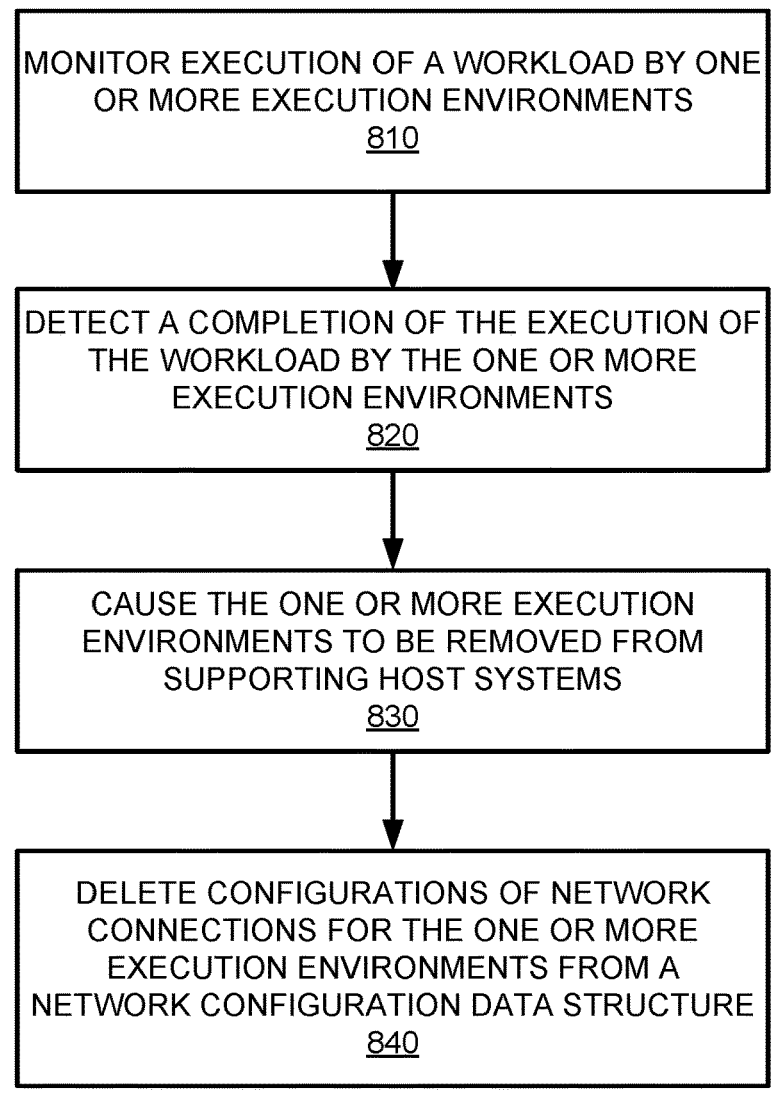
FIG. 8 is a flow diagram of a method of monitoring the execution of workloads by execution environments, in accordance with some embodiments.

FIG. 8 is a flow diagram of a method 800 of monitoring the execution of workloads by execution environments, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by network configuration component 142 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic monitors the execution of a workload by one or more execution environments.

At block 820, the processing logic detects a completion of the execution of the workload by the one or more execution environments. In embodiments, the processing logic may detect a completion of the execution by receiving an indication from the one or more execution environments that the execution of the workload has completed.

At block 830, the processing logic causes the one or more execution environments to be removed from supporting host systems. In embodiments, the processing logic may cause the one or more execution environments to be removed by transmitting a command to the supporting host systems to remove the one or more execution environments. For example, the processing logic may transmit a command to a host system that causes the host system to remove a container that has completed executing a workload.

At block 840, the processing logic deletes configurations of network connections for the one or more execution environments from a network configuration data structure. The network configuration data structure may correspond to network configuration data structure 406 of FIG. 4 or network configuration data structure 608 of FIG. 6.

Figure 9:
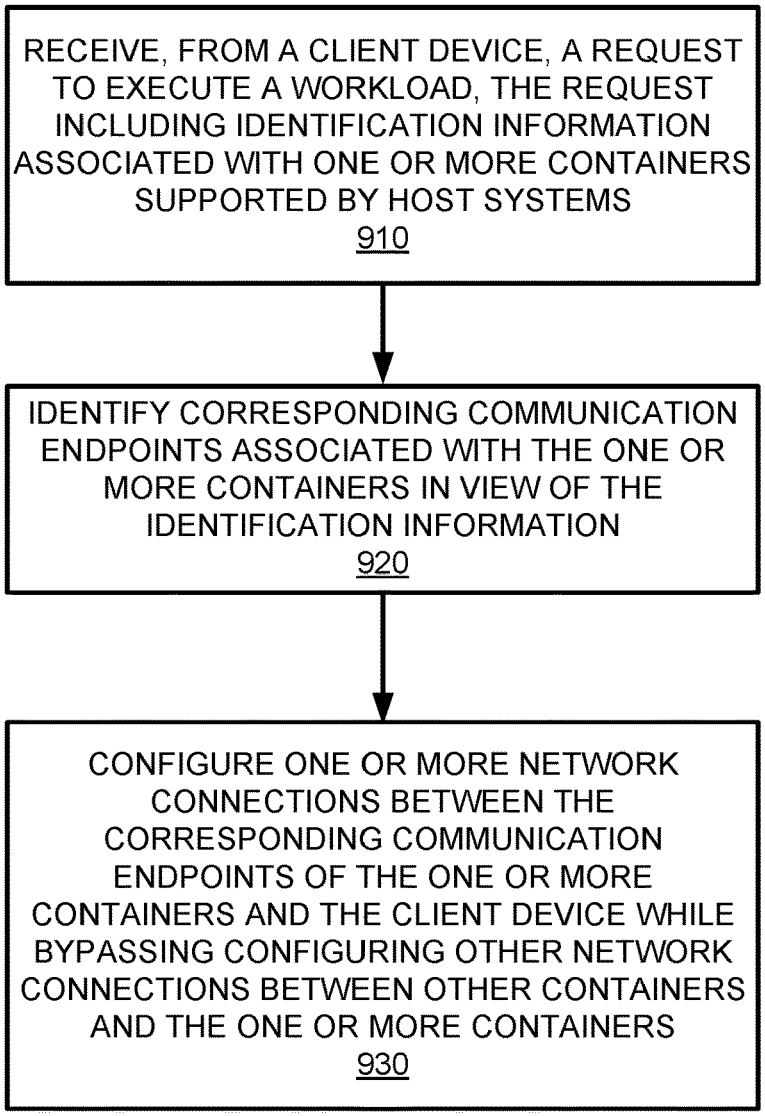
FIG. 9 is a flow diagram of a method of configuring network connections to containers identified by a request to execute a workload, in accordance with some embodiments.

FIG. 9 is a flow diagram of a method 900 of configuring network connections to containers identified by a request to execute a workload, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by network configuration component 142 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives, from a client device, a request to execute a workload. The request may include identification information associated with one or more containers that are supported by host systems of a microservice architecture.

At block 920, the processing logic identifies corresponding communication endpoints associated with the one or more containers in view of the identification information.

At block 930, the processing logic configures one or more network connections between the corresponding communication endpoints of the one or more containers and the client device. The processing logic may bypass configuring other network connections between other containers of the microservice architecture and the one or more containers, as previously described.

Figure 10:
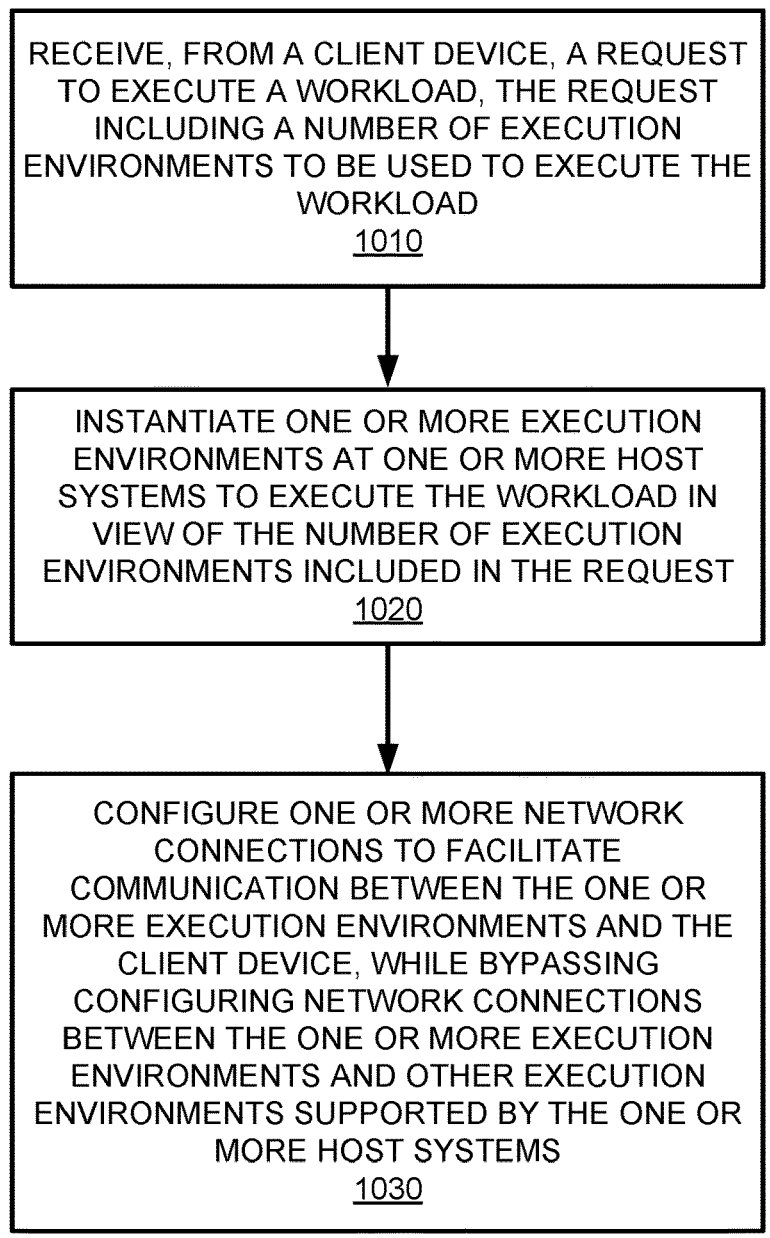
FIG. 10 is a flow diagram of a method of configuring network connections to a number of execution environments that are to execute a workload, in accordance with some embodiments.

FIG. 10 is a flow diagram of a method 1000 of configuring network connections to a number of execution environments that are to execute a workload, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by network configuration component 142 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic receives, from a client device, a request to execute a workload. The request may include a number of execution environments that are to be used to execute the workload.

At block 1020, the processing logic instantiates one or more execution environments at one or more host systems to execute the workload. The processing logic may instantiate the one or more execution environments in view of the number of execution environments included in the request. For example, if the request received at block 1010 indicates that three containers are to be used to execute the workload, then the processing logic may instantiate three containers.

At block 1030, the processing logic configures one or more network connections to facilitate communication between the one or more execution environments and the client device. The processing logic may bypass configuring network connections between the one or more execution environments and other execution environments supported by the one or more host systems.

Figure 11:
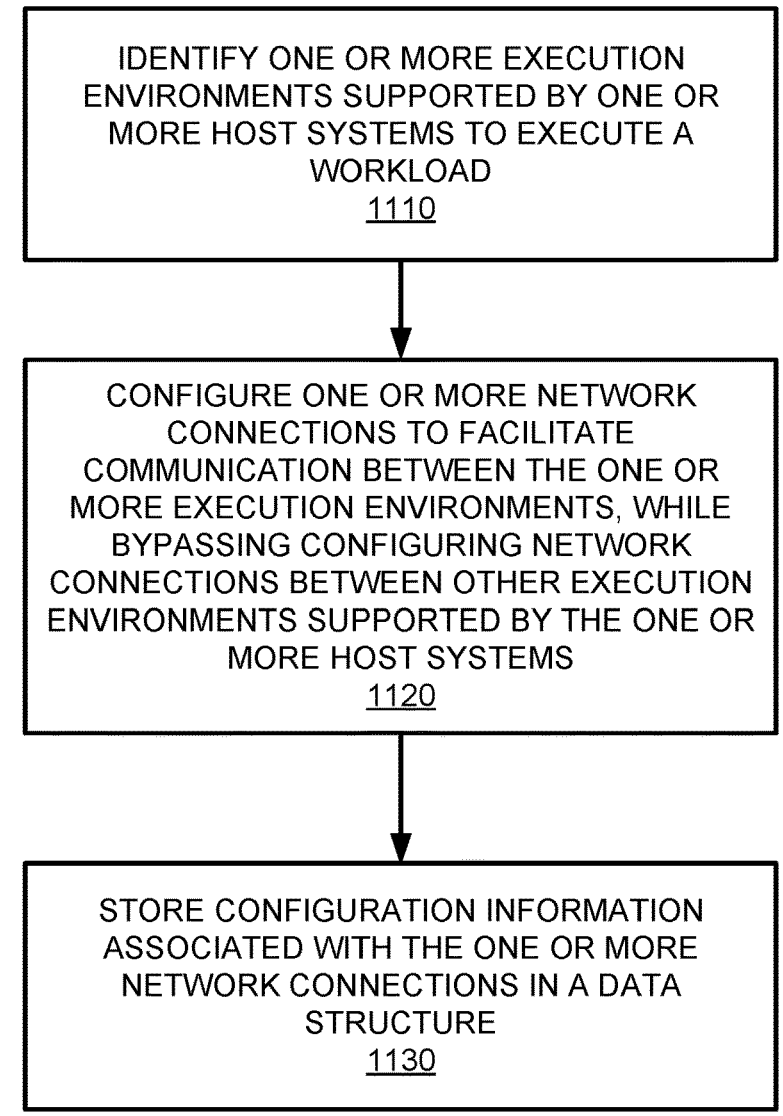
FIG. 11 is a flow diagram of a method of configuring network connections to one or more identified execution environments, in accordance with some embodiments.

FIG. 11 is a flow diagram of a method 1100 of configuring network connections to one or more identified execution environments, in accordance with some embodiments. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1100 may be performed by network configuration component 142 of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic identifies one or more execution environments supported by one or more host systems to execute a workload. In some embodiments, the processing logic may identify the one or more execution environments in response to receiving a request to execute a workload, as previously described.

At block 1120, the processing logic configures one or more network connections to facilitate communication between the one or more execution environments and the client device. The processing logic may bypass configuring network connections between the one or more execution environments and other execution environments supported by the one or more host systems.

At block 1130, the processing logic stored configuration information associated with the one or more network connections in a data structure, as previously described.

Figure 12:
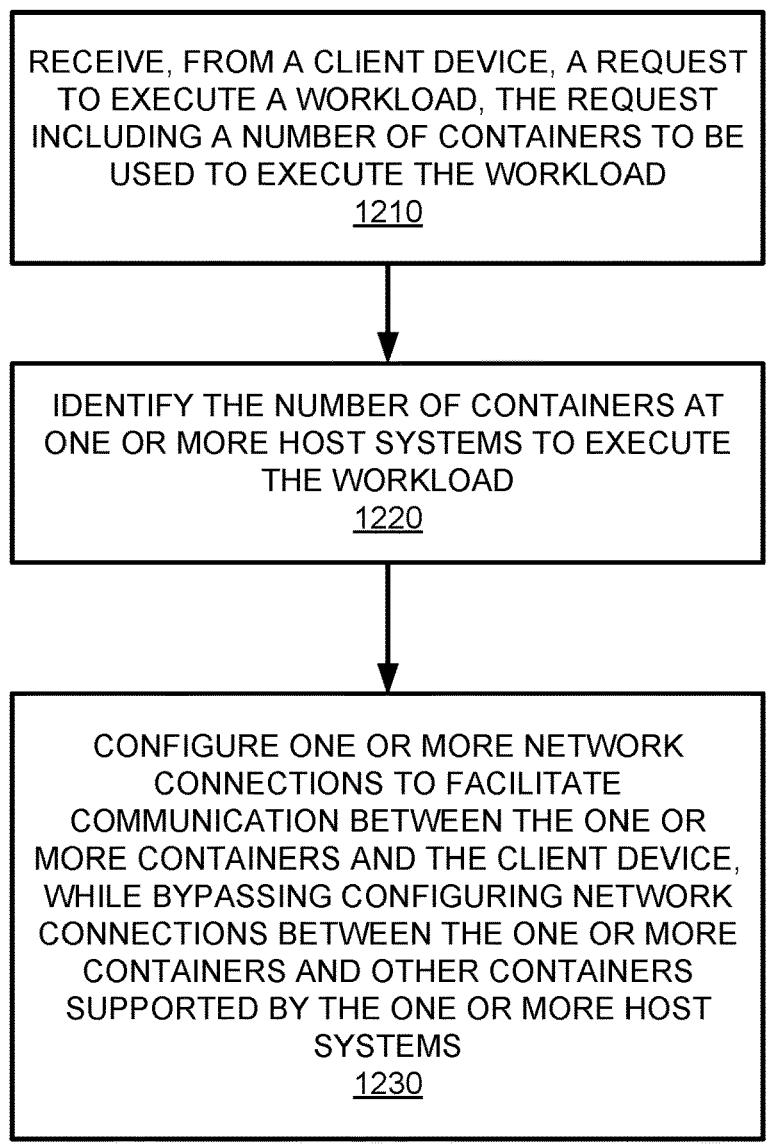
FIG. 12 is a flow diagram of a method of configuring network connections to a number of execution environments that are to execute a workload, in accordance with some embodiments.

FIG. 12 is a flow diagram of a method 1200 of configuring network connections to a number of execution environments that are to execute a workload, in accordance with some embodiments. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, at least a portion of method 1200 may be performed by network configuration component 142 of FIG. 1.

With reference to FIG. 12, method 1200 illustrates example functions used by various embodiments. Although specific function blocks ("blocks") are disclosed in method 1100, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Method 1200 begins at block 1210, where the processing logic receives, from the client device, a request to execute a workload. The request may include a number of containers to be used to execute the workload.

At block 1220, the processing logic identifies the number of containers are one or more host systems to execute the workload.

At block 1230, the processing logic configures one or more network connections between the one or more containers and the client device. The processing logic may bypass configuring other network connections between other containers supported by the one or more host systems and the one or more containers, as previously described.

Figure 13:
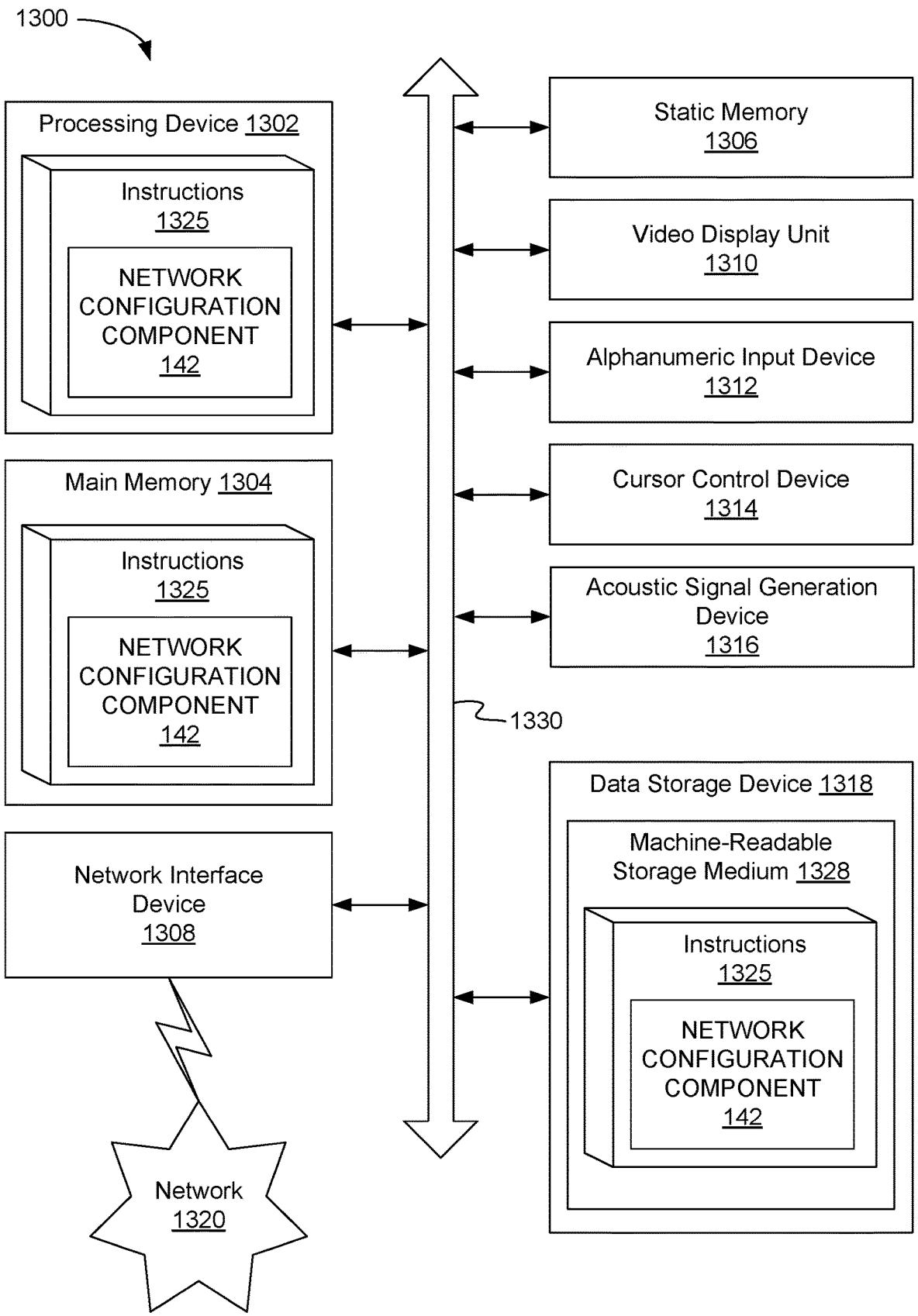
FIG. 13 is a block diagram of an example apparatus that may perform one or more of the operations described herein, in accordance with some embodiments of the present disclosure.

FIG. 13 is a block diagram of an example computing device 1300 that may perform one or more of the operations described herein, in accordance with some embodiments. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device (e.g., a general purpose processor, a PLD, etc.) 1302, a main memory 1304 (e.g., synchronous dynamic random access memory (DRAM), read-only memory (ROM)), a static memory 1306 (e.g., flash memory and a data storage device 1318), which may communicate with each other via a bus 1330.

Processing device 1302 may be provided by one or more general-purpose processing devices such as a microprocessor, central processing unit, or the like. In an illustrative example, processing device 1302 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also comprise one or more special-purpose processing devices such as an application specific integrated circuit (ASIC), a field programmable gate array (FPGA), a digital signal processor (DSP), network processor, or the like. The processing device 1302 may be configured to execute the operations described herein, in accordance with one or more aspects of the present disclosure, for performing the operations and steps discussed herein.

Computing device 1300 may further include a network interface device 1308 which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and an acoustic signal generation device 1316 (e.g., a speaker). In one embodiment, video display unit 1310, alphanumeric input device 1312, and cursor control device 1314 may be combined into a single component or device (e.g., an LCD touch screen).

Data storage device 1318 may include a computer-readable storage medium 1328 on which may be stored one or more sets of instructions 1325 that may include instructions for a network configuration component, e.g., network configuration component 142 for carrying out the operations described herein, in accordance with one or more aspects of the present disclosure. Instructions 1325 may also reside, completely or at least partially, within main memory 1304 and/or within processing device 1302 during execution thereof by computing device 1300, main memory 1304 and processing device 1302 also constituting computer-readable media. The instructions 1325 may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving, from a client device, a request to execute a workload, the request comprising identification information associated with one or more containers of a plurality of containers supported by a plurality of host systems, the one or more containers to execute the workload; identifying corresponding communication endpoints associated with the one or more containers in view of the identification information; and configuring, by a processing device, one or more network connections between the corresponding communication endpoints of the one or more containers and the client device while bypassing configuring other network connections between other containers of the plurality of containers and the one or more containers.

Example 2 is the method of Example 1, wherein the one or more containers reside within one or more virtual machines.

Example 3 is the method of any of Examples 1-2, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

Example 4 is the method of any of Examples 1-3, further comprising: storing the configuration of the one or more network connections in a network configuration data structure, wherein the network configuration data structure is to be stored in a memory that is accessible to a virtual network device.

Example 5 is the method of any of Examples 1-4, further comprising: detecting a completion of the execution of the workload by the one or more containers; causing the one or more containers to be removed from the plurality of host systems; and deleting the configuration of the one or more network connections in the network configuration data structure.

Example 6 is the method of any of Examples 1-5, wherein results of the execution of the workload by the one or more containers are to be provided to the client device via the configured one or more network connections.

Example 7 is the method of any of Examples 1-6, wherein the one or more containers are supported by a same host system and wherein configuring the one or more network connections comprises configuring one or more virtual network connections between the one or more containers while bypassing configuring virtual network connections to other containers supported by the same host system.

Example 8 is a system comprising: a memory; and a processing device, operatively coupled to the memory, to: receive, from a client device, a request to execute a workload, the request comprising a number of execution environments to be used to execute the workload; instantiate one or more execution environments at one or more host systems to execute the workload in view of the number of execution environments included in the request; and configure one or more network connections to facilitate communication between the one or more execution environments and the client device, while bypassing configuring network connections between the one or more execution environments and other execution environments supported by the one or more host systems.

Example 9 is the system of Example 8, wherein the one or more execution environments comprise one or more virtual machines.

Example 10 is the system of any of Examples 8-9, wherein the one or more execution environments comprise one or more containers.

Example 11 is the system of any of Examples 8-10, wherein the one or more execution environments comprise one or more containers that reside within one or more virtual machines.

Example 12 is the system of any of Examples 8-11, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

Example 13 is the system of any of Examples 8-12, wherein the processing device is further to: store the configuration of the one or more network connections in a network configuration data structure, wherein the network configuration data structure is to be stored in a memory that is accessible to a virtual network device.

Example 14 is the system of any of Examples 8-13, wherein the processing device is further to: detect a completion of the execution of the workload by the one or more execution environments; cause the one or more execution environments to be removed from the one or more host systems; and delete the configuration of the one or more network connections in the network configuration data structure.

Example 15 is the system of any of Examples 8-14, wherein results of the execution of the workload by the one or more execution environments are to be provided to the client device via the configured one or more network connections.

Example 16 is the system of any of Examples 8-15, wherein the one or more execution environments are supported by a same host system and wherein configuring the one or more network connections comprises configuring one or more virtual network connections between the one or more execution environments while bypassing configuring virtual network connections to other execution environments supported by the same host system.

Example 17 is a non-transitory computer-readable storage medium including instructions that, when executed by a processing device, cause the processing device to: identify one or more execution environments supported by one or more host systems to execute a workload; configure, by the processing device, one or more network connections to facilitate communication between the one or more execution environments, while bypassing configuring network connections between other execution environments supported by the one or more host systems; and store configuration information associated with the one or more network connections in a data structure.

Example 18 is the non-transitory computer-readable storage medium of Example 17, wherein the processing device is further to: receive, from a client device, a request to execute the workload, wherein the one or more execution environments are identified in response to receiving the request.

Example 19 is the non-transitory computer-readable storage medium of any of Examples 17-18, wherein to configure the one or more network connections, the processing device is further to: configure one or more network connections to facilitate communication between the one or more execution environments and the client device.

Example 20 is the non-transitory computer-readable storage medium of any of Examples 17-19, wherein the results of the execution of the workload by the one or more execution environments are to be provided to the client device via the configured one or more network connections.

Example 21 is the non-transitory computer-readable storage medium of any of Examples 17-20, wherein the one or more execution environments comprise one or more virtual machines.

Example 22 is the non-transitory computer-readable storage medium of any of Examples 17-21, wherein the one or more execution environments comprise one or more containers.

Example 23 is the non-transitory computer-readable storage medium of any of Examples 17-22, wherein the one or more execution environments comprise one or more containers that reside within one or more virtual machines.

Example 24 is the non-transitory computer-readable storage medium of any of Examples 17-23, wherein the processing device is further to: detect a completion of the execution of the workload by the one or more execution environments; cause the one or more execution environments to be removed from the one or more host systems; and delete the configuration of the one or more network connections in the data structure.

Example 25 is a method comprising: receiving, from a client device, a request to execute a workload, the request comprising a number of containers to be used to execute the workload; identifying the number of containers at one or more host systems to execute the workload; and configuring, by a processing device, one or more network connections to facilitate communication between the number of containers and the client device, while bypassing configuring network connections between the number of containers and other containers supported by the one or more host systems.

Example 26 is the method of Example 25, wherein the number of containers reside within one or more virtual machines.

Example 27 is the method of any of Examples 25-26, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

Example 28 is the method of any of Examples 25-27, further comprising: storing the configuration of the one or more network connections in a network configuration data structure, wherein the network configuration data structure is to be stored in a memory that is accessible to a virtual network device.

Example 29 is the method of any of Examples 25-28, further comprising: detecting a completion of the execution of the workload by the one or more containers; causing the one or more containers to be removed from the one or more host systems; and deleting the configuration of the one or more network connections in the network configuration data structure.

Example 30 is an apparatus comprising: means for receiving, from a client device, a request to execute a workload, the request comprising identification information associated with one or more containers of a plurality of containers supported by a plurality of host systems, the one or more containers to execute the workload; means for identifying corresponding communication endpoints associated with the one or more containers in view of the identification information; and means for configuring one or more network connections between the corresponding communication endpoints of the one or more containers and the client device while bypassing configuring other network connections between other containers of the plurality of containers and the one or more containers.

Example 31 is the apparatus of Example 30, wherein the one or more containers reside within one or more virtual machines.

Example 32 is the apparatus of any of Examples 30-31, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

Example 33 is the apparatus of any of Examples 30-32, further comprising: means for storing the configuration of the one or more network connections in a network configuration data structure, wherein the network configuration data structure is to be stored in a memory that is accessible to a virtual network device.

Example 34 is the apparatus of any of Examples 30-33, further comprising: means for detecting a completion of the execution of the workload by the one or more containers; means for causing the one or more containers to be removed from the plurality of host systems; and means for deleting the configuration of the one or more network connections in the network configuration data structure.

Example 35 is the apparatus of any of Examples 30-34, wherein results of the execution of the workload by the one or more containers are to be provided to the client device via the configured one or more network connections.

Example 36 is the apparatus of any of Examples 30-35, wherein the one or more containers are supported by a same host system and wherein configuring the one or more network connections comprises configuring one or more virtual network connections between the one or more containers while bypassing configuring virtual network connections to other containers supported by the same host system.

Unless specifically stated otherwise, terms such as "receiving," "configuring," "identifying," "transmitting," "storing," "deleting," "instantiating," "detecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, from a client device, a request to execute a workload, the request comprising identification information associated with one or more containers of a plurality of containers supported by a plurality of host systems, the one or more containers to execute the workload;
identifying corresponding communication endpoints associated with the one or more containers in view of the identification information, the communication endpoints providing connectivity for the workload to be executed by the one or more containers; and
configuring, by a processing device, one or more network connections between the corresponding communication endpoints of the one or more containers and the client device while bypassing configuring other network connections between other containers of the plurality of containers and the one or more containers that are to execute the workload.

2. The method of claim 1, wherein the one or more containers reside within one or more virtual machines.

3. The method of claim 2, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

4. The method of claim 1, further comprising:
storing the configuration of the one or more network connections in a network configuration data structure, wherein the network configuration data structure is to be stored in a memory that is accessible to a virtual network device.

5. The method of claim 4, further comprising:
detecting a completion of the execution of the workload by the one or more containers;
causing the one or more containers to be removed from the plurality of host systems; and
deleting the configuration of the one or more network connections in the network configuration data structure.

6. The method of claim 1, wherein results of the execution of the workload by the one or more containers are to be provided to the client device via the configured one or more network connections.

7. The method of claim 1, wherein the one or more containers are supported by a same host system and wherein configuring the one or more network connections comprises configuring one or more virtual network connections between the one or more containers while bypassing configuring virtual network connections to other containers supported by the same host system.

8. A system comprising:
a memory; and
a processing device, operatively coupled to the memory, to:
receive, from a client device, a request to execute a workload, the request comprising a number of execution environments to be used to execute the workload;
instantiate one or more execution environments at one or more host systems to execute the workload in view of the number of execution environments included in the request, the communication endpoints providing connectivity for the workload to be executed by the one or more host systems; and
configure one or more network connections to facilitate communication between the one or more execution environments and the client device, while bypassing configuring network connections between the one or more execution environments and other execution environments supported by the one or more host systems that are to execute the workload.

9. The system of claim 8, wherein the one or more execution environments comprise one or more virtual machines.

10. The system of claim 8, wherein the one or more execution environments comprise one or more containers.

11. The system of claim 8, wherein the one or more execution environments comprise one or more containers that reside within one or more virtual machines.

12. The system of claim 11, wherein the one or more virtual machines comprise a first virtual machine supported by a first host system and a second virtual machine supported by a second host system and wherein configuring the one or more network connections comprise configuring a virtual network connection between the first virtual machine and the second virtual machine, while bypassing configuring virtual network connections to other virtual machines supported by the first host system and the second host system.

13. The system of claim 8, wherein the processing device is further to:
store the configuration of the one or more network connections in a network configuration data structure, wherein the network configuration data structure is to be stored in a memory that is accessible to a virtual network device.

14. The system of claim 13, wherein the processing device is further to:
   detect a completion of the execution of the workload by the one or more execution environments;
   cause the one or more execution environments to be removed from the one or more host systems; and
   delete the configuration of the one or more network connections in the network configuration data structure.

15. The system of claim 8, wherein results of the execution of the workload by the one or more execution environments are to be provided to the client device via the configured one or more network connections.

16. The system of claim 8, wherein the one or more execution environments are supported by a same host system and wherein configuring the one or more network connections comprises configuring one or more virtual network connections between the one or more execution environments while bypassing configuring virtual network connections to other execution environments supported by the same host system.

17. A non-transitory computer-readable storage medium including instructions that, when executed by a processing device, cause the processing device to:
   identify one or more execution environments supported by one or more host systems to execute a workload;
   configure, by the processing device, one or more network connections to facilitate communication between the one or more execution environments and a corresponding client device via corresponding communication endpoints providing connectivity for the workload to be executed by the one or more execution environments, while bypassing configuring network connections between other execution environments supported by the one or more host systems and the one or more execution environments that are to execute the workload; and
   store configuration information associated with the one or more network connections in a data structure.

18. The non-transitory computer-readable storage medium of claim 17, wherein the processing device is further to:
   receive, from a client device, a request to execute the workload, wherein the one or more execution environments are identified in response to receiving the request.

19. The non-transitory computer-readable storage medium of claim 18, wherein to configure the one or more network connections, the processing device is further to:
   configure one or more network connections to facilitate communication between the one or more execution environments and the client device.

20. The non-transitory computer-readable storage medium of claim 19, wherein the results of the execution of the workload by the one or more execution environments are to be provided to the client device via the configured one or more network connections.

* * * * *